United States Patent [19]
Kimener

[11] Patent Number: 6,138,812
[45] Date of Patent: Oct. 31, 2000

[54] EDGE PROTECTION GATE

[75] Inventor: Tom Kimener, Milford, Ohio

[73] Assignee: Midwest Industrial Door, Inc., Loveland, Ohio

[21] Appl. No.: 09/222,602

[22] Filed: Dec. 29, 1998

Related U.S. Application Data

[60] Provisional application No. 60/097,792, Aug. 25, 1998.

[51] Int. Cl.[7] .................................................. B65G 13/00
[52] U.S. Cl. ............................ 193/356; 414/276; 49/133
[58] Field of Search .......................... 193/356; 414/276; 49/131, 133

[56] References Cited

U.S. PATENT DOCUMENTS

| | | | |
|---|---|---|---|
| 1,217,651 | 2/1917 | Sortland | 49/133 |
| 1,305,907 | 6/1919 | Land | 49/133 |
| 1,356,989 | 10/1920 | Kelley | 49/133 |
| 4,041,646 | 8/1977 | Mittag | 49/385 |
| 4,150,510 | 4/1979 | Harrison et al. | 49/388 |
| 4,422,264 | 12/1983 | Harris | 49/121 |
| 4,538,379 | 9/1985 | Vargo | 49/381 |
| 5,546,703 | 8/1996 | Conway | 49/197 |
| 5,592,779 | 1/1997 | Conway | 49/73.1 |
| 5,671,500 | 9/1997 | Balk | 16/72 |
| 5,701,701 | 12/1997 | Desrosiers | 49/116 |
| 5,709,050 | 1/1998 | Benko | 49/109 |

*Primary Examiner*—Jospeh E. Valenza
*Attorney, Agent, or Firm*—Thompson Hine & Flory LLP

[57] ABSTRACT

An elevated loading/conveyor platform includes a generally rectangular knock-over gate positioned in the load-in side opening of the platform structure, where the knock-over gate is pivotally mounted within the load-in side opening and pivotable from a vertically upright barrier position to a generally horizontal loading position. The knock-over gate is biased to the vertical position by a return mechanism, which is designed to return the knock-over gate to its upright vertical orientation when no pallets are being conveyed thereover in the generally horizontal loading position. Preferably, the return mechanism utilizes a spring mechanism (such as gas springs), where the spring mechanism is of sufficient strength to pivot the knock-over gate from the horizontal loading position to the vertical position when no weight or force is being applied to the load-in side of the gate. Optionally, the barrier system may include a hold-down latch assembly for retaining the knock-over gate in its horizontal loading position until the pallet is conveyed beyond the barrier member. The load-in side of the knock-over gate also includes rollers attached thereto so as to facilitate the conveyance of articles thereover when in the generally horizontal loading position.

23 Claims, 15 Drawing Sheets

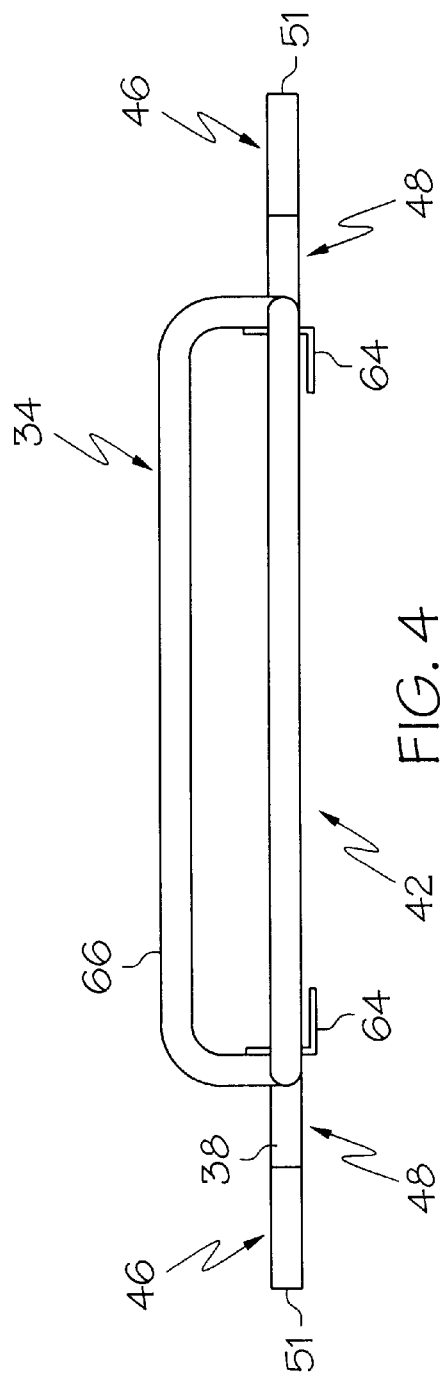
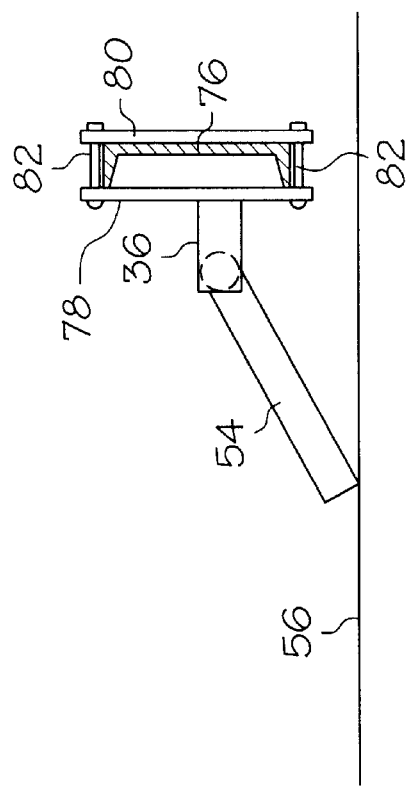

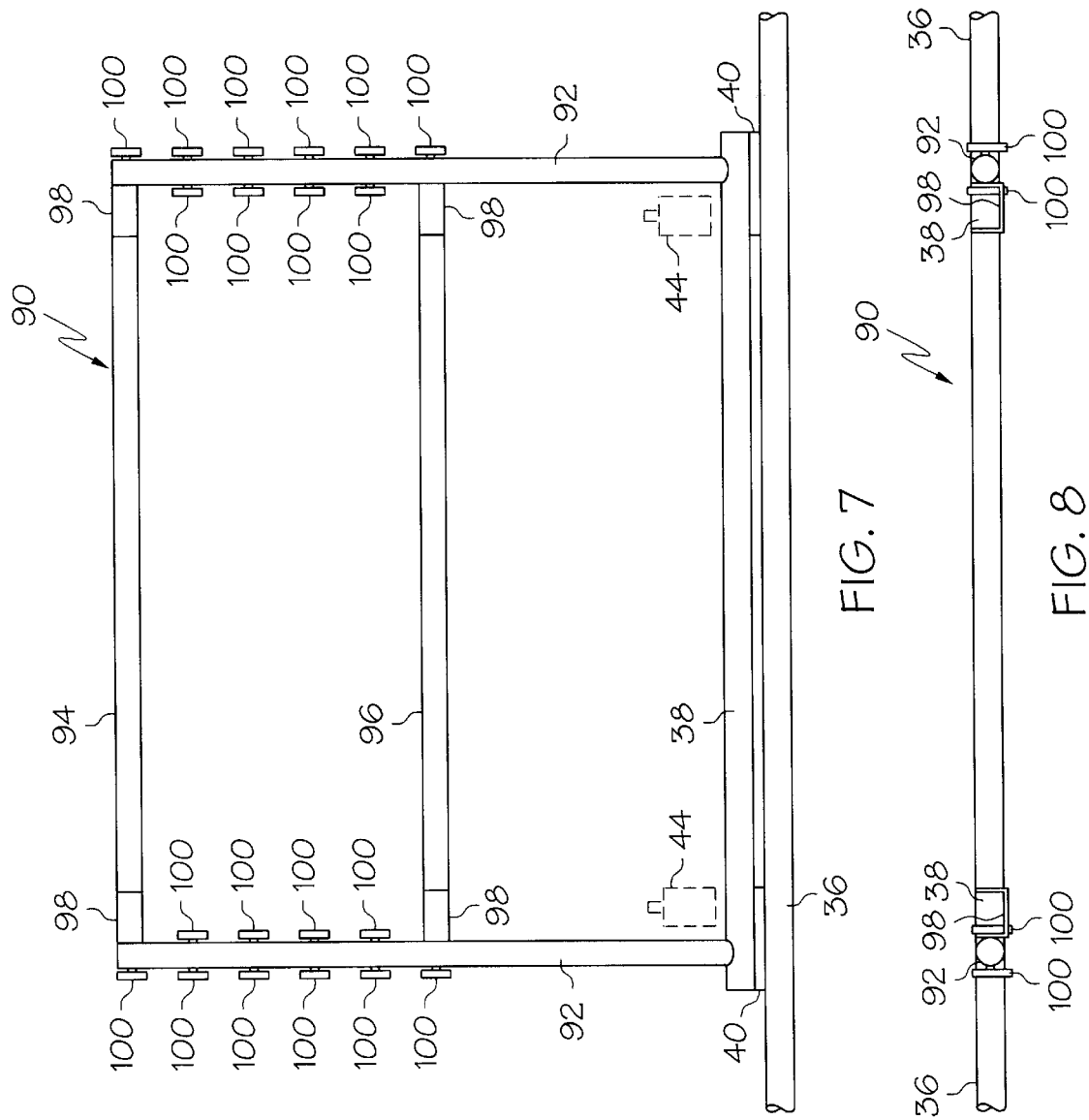

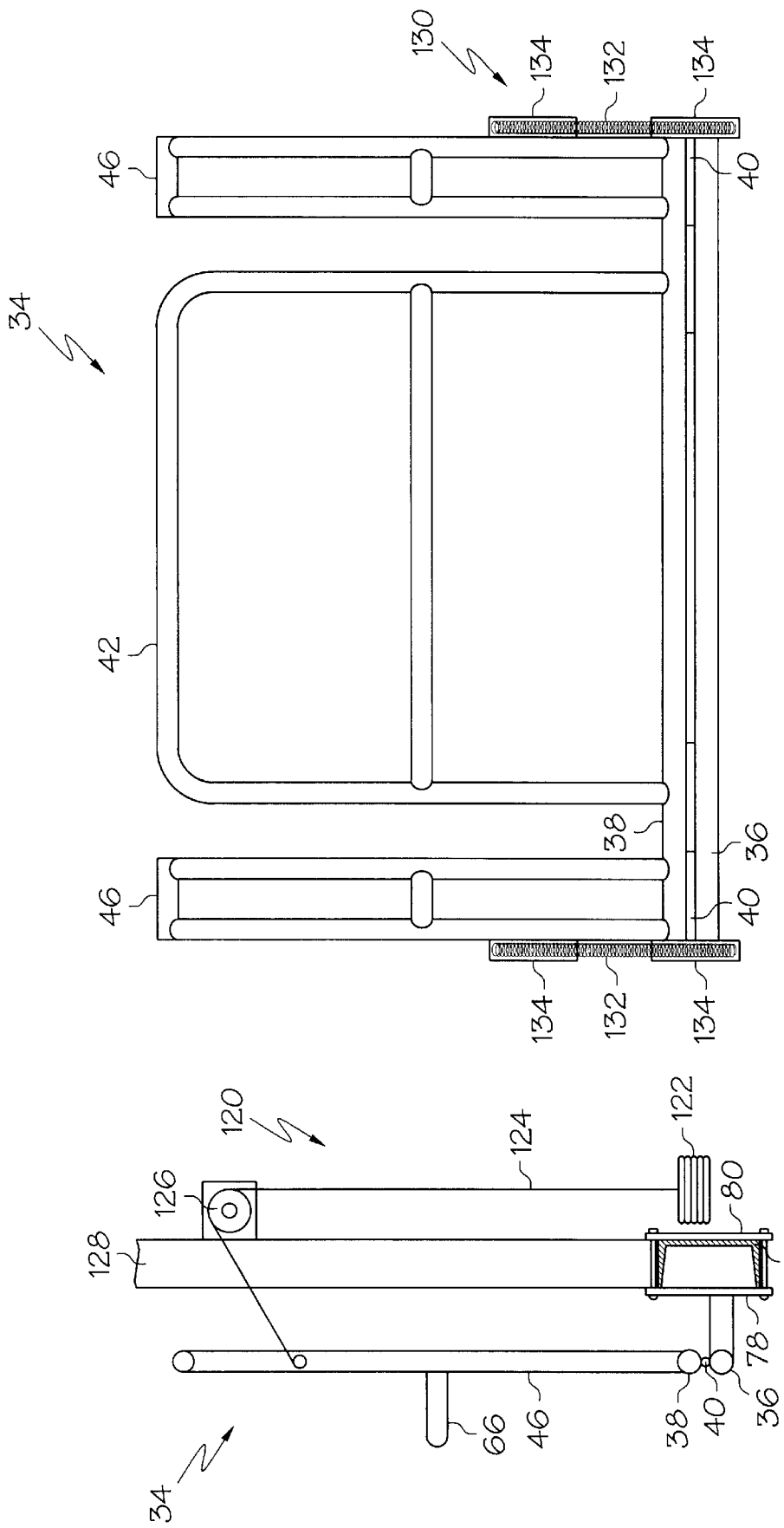

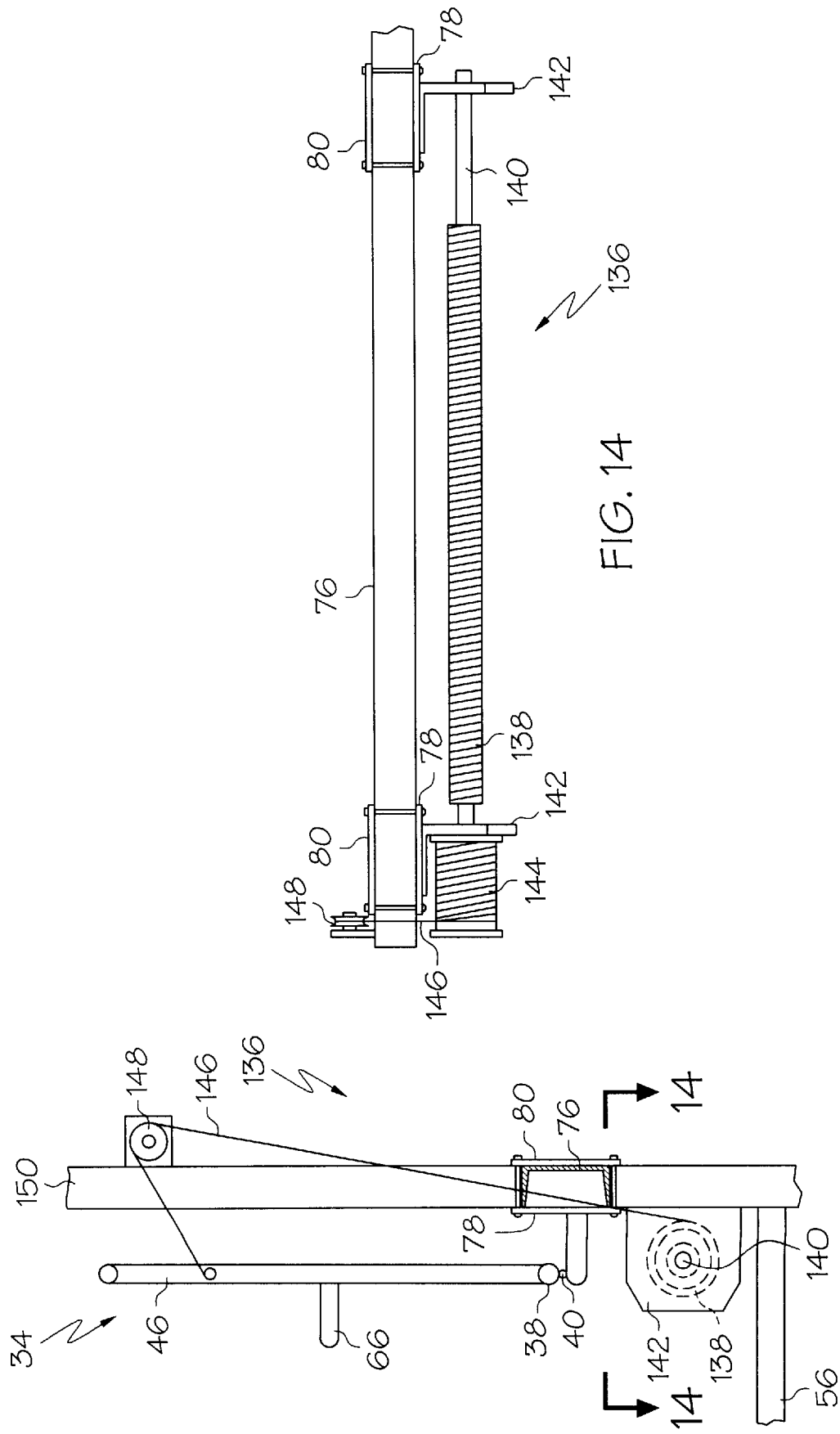

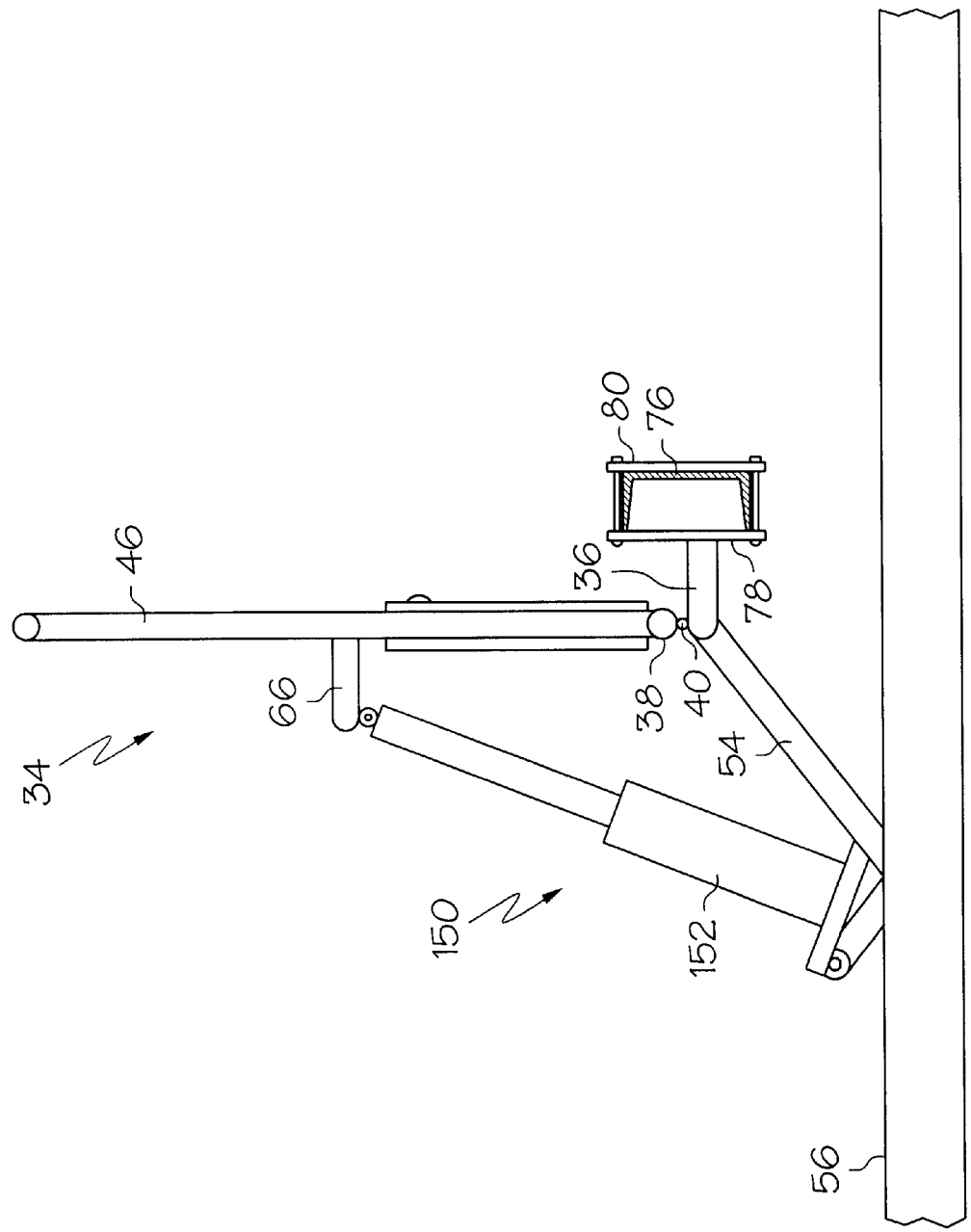

EDGE PROTECTION GATE

CROSS-REFERENCE TO RELATED APPLICATIONS

The present application claims priority under 35 U.S.C. §119 from Provisional Application Ser. No. 60/097,792, filed Aug. 25, 1998.

BACKGROUND

The present invention is a barrier assembly for protecting the edge of an elevated conveyor platform or mezzanine, where the conveyor platform is adapted to receive pallets of articles from an elevated load-in side of the conveyor platform and to convey the pallets to a handling side of the conveyor platform.

A typical distribution center or warehouse may include a plurality of elevated conveyor platforms that have openings on the load-in side of the conveyor platforms for receiving pallets of articles from forklift trucks, and for conveying the pallets from the load-in side to the handling side where workers will remove the articles from the pallets and place them on (typically motorized) conveyors. Each of the conveyor platforms include a roller conveyor (or any other type of conveyor) for conveying the pallets from the load-in side to the handling side of the conveyor platform. Despite the fact that the workers will typically remain on the handling side of the conveyor platforms, the openings from the load-in side to the conveyor platforms for receiving the pallets from the forklift trucks present a potential fall hazard for the workers if, for example, the worker would need to approach the openings to dislodge a stuck pallet. Accordingly, a need exists for an apparatus and system to provide a barrier in the openings to the conveyor platforms which allows the pallets to be loaded onto the conveyors by forklift trucks, but which also inhibits the workers from falling through the openings from the conveyor platforms when the conveyors are not in use, or when the conveyors are occupied by a load or a pallet.

SUMMARY OF THE INVENTION

The present invention therefore provides a barrier system for an elevated loading/conveyor platform comprising a generally rectangular knock-over gate positioned in the load-in side opening of the platform structure, where the knock-over gate is pivotally mounted within the load-in side opening and pivotable from a vertically upright barrier position to a generally horizontal loading position. The knock-over gate is biased to the vertical position by a return mechanism, which is designed to return the knock-over gate to its upright vertical orientation when no pallets are being conveyed thereover in the generally horizontal loading position. Preferably, the return mechanism utilizes a spring mechanism (such as gas springs), where the spring mechanism is of sufficient strength to pivot the knock-over gate from the horizontal loading position to the vertical position when no weight or force is being applied to the load-in side of the gate. Optionally, the barrier system may include a hold-down latch assembly for retaining the knock-over gate in its horizontal loading position until the pallet is conveyed beyond the barrier member.

Preferably, the load-in side of the knock-over gate includes rollers attached thereto so as to facilitate the conveyance of articles thereover when in the generally horizontal loading position. These rollers are preferably free-spinning may be also be motorized if desired. The load-in side of the knock-over gate also preferably includes rub/contact plates attached thereto and positioned to bear impact from forklift tines.

The knock-over gate preferably includes at least one vertical gap adapted to receive a conveyor bar of the conveyor platform therein when the gate is pivoted to the generally horizontal loading position. The knock-over gate also preferably includes at least two horizontal cross-rails, where a first cross-rail is positioned approximately forty to fifty inches from a floor of the conveyor platform and where a second cross-rail is positioned approximately twenty to twenty-five inches from the floor of the conveyor platform. The second cross-rail is preferably substantially U-shaped, arcing inwardly and horizontally towards the platform when the gate is in the substantially vertical barrier position, so that the second cross-rail provides structural strength to the gate and also provides a support for contacting the floor of the conveyor platform when the gate is in the generally horizontal loading position.

In another aspect of the present invention a barrier system for protecting an edge of an elevated conveyor platform comprises a gate pivotally mounted at a lower end thereof to the conveyor platform structure, approximate the load-in side opening of the conveyor platform, where the gate is pivotable from a substantially vertical barrier position to a generally horizontal loading position. The barrier system also comprises means for facilitating the conveyance of articles over the gate when the gate is in the generally horizontal loading position and means for pivoting the gate from the generally horizontal loading position to the substantially vertical barrier position when articles are not being conveyed over the gate.

In another aspect of the present invention a method for loading articles onto an elevated conveyor platform and for simultaneously protecting workers from an edge of the elevated conveyor platform comprises the steps of: (a) providing a gate pivotally mounted at a lower end thereof to the conveyor platform structure, approximate the load-in side opening of the conveyor platform, where the gate is pivotable from a substantially vertical barrier position to a generally horizontal loading position; (b) pivoting the gate to the generally horizontal loading position to receive the article within the load-in side opening of the conveyor platform; (c) loading an article on the generally horizontal gate; (d) conveying the article over the generally horizontal gate; and, after the article has been conveyed over the generally horizontal gate, (e) pivoting the gate back to the substantially vertical barrier position. Preferably, the method also includes the steps of locking the gate in the generally horizontal loading position after the gate is pivoted to the generally horizontal loading position, sensing the presence or non-presence of articles on the gate locked in the generally horizontal loading position, and upon the sensing the non-presence of articles on the gate locked in the generally horizontal loading position, unlocking the gate from the generally horizontal loading position.

Accordingly, it is an object of the present invention to provide a barrier assembly for protecting the load-in side opening/edge of an elevated conveyor platform or mezzanine, which provides a barrier gate blocking the opening when no articles are being loaded onto the conveyor and which does not restrict the process of loading articles, through the opening, and onto the conveyor. It is a further object of the present invention to provide a barrier system that is relatively easy to install onto existing conveyor platforms, that is relatively rugged, and that meets appropriate safety codes for such systems and platforms. These and other objects and advantages of the present invention will be apparent from the following description, the appended claims and the attached drawings.

BRIEF DESCRIPTION OF THE DRAWINGS

FIG. 4 is a top plan view of the knock-over gate assembly of FIGS. 2 and 3;

FIG. 5 is an elevational side view of the assembly for mounting the knock-over gate assembly within the inside opening of the loading platform;

FIG. 7 is an elevational load-in side view of an alternate embodiment of the knock-over gate assembly for use with the present invention;

FIG. 8 is a top plan view of the knock-over gate assembly of FIG. 7;

FIG. 11 is an elevational side view of the knock-over gate assembly of FIGS. 2–5 incorporating an alternate embodiment of the return mechanism;

FIG. 12 is an elevational load-in side view of the knock-over gate assembly of FIGS. 2–5 incorporating another alternate embodiment of the return mechanism;

FIG. 13 is an elevational side view of the knock-over gate assembly of FIGS. 2–5 incorporating yet another alternate embodiment of the return mechanism;

FIG. 14 is the knock-over gate assembly and return mechanism of FIG. 13, taken along lines 14—14 of FIG. 13;

FIG. 15 is an elevational side view of the knock-over gate assembly of FIGS. 2–5 incorporating yet another alternate embodiment of the return mechanism;

DETAILED DESCRIPTION OF THE INVENTION

Figure 1:
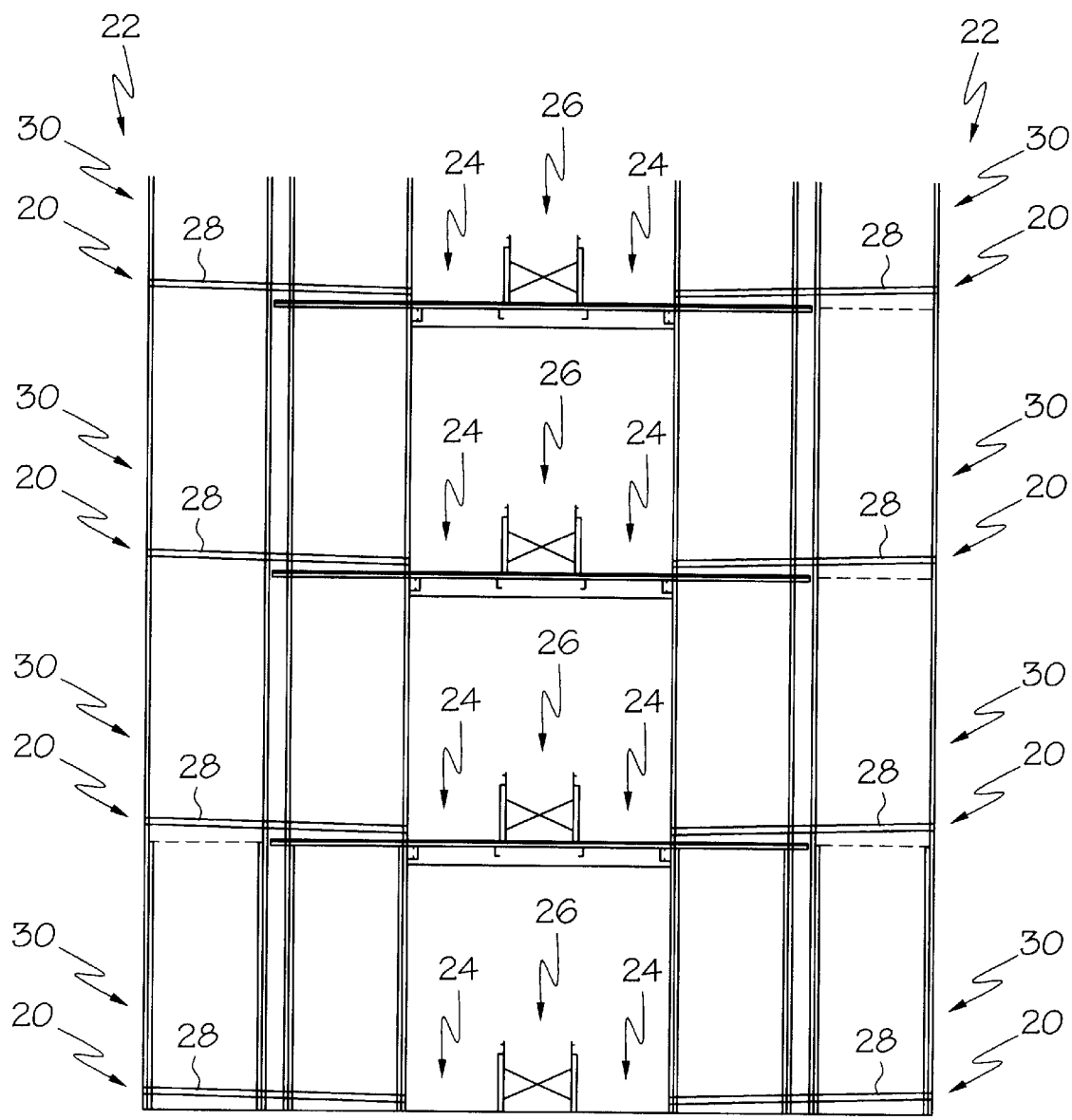
FIG. 1 is an elevational view of a warehouse or distribution center incorporating a plurality of elevated conveyor platforms or mezzanines.

As shown in FIG. 1, a typical distribution center or warehouse may include a plurality of elevated conveyor platforms 20 which have openings 30 on the load-in side 22 of the conveyor platforms for receiving pallets of articles from forklift trucks, and for conveying the pallets from the load-in side 22 to the handling side 24 where workers will remove the articles from the pallets and place them on (typically motorized) conveyors 26. Each of the conveyor platforms include a roller conveyor 28 (or any other type of conveyor) for conveying the pallets from the load-in side 22 to the handling side 24. Despite the fact that the workers will typically remain on the handling side of the conveyor platforms, the openings 30 from the load-in side to the conveyor platforms for receiving the pallets from the forklift trucks present a potential fall hazard for the workers if, for example, the worker would need to approach the openings 30 and dislodge a stuck pallet. Accordingly, the present invention provides an apparatus and system to provide a barrier in the openings 30 to the conveyor platforms 20 which allows the pallets to be loaded onto the conveyors 28 by forklift trucks, but which also inhibits the workers from falling through the openings 30 from the conveyor platforms when the conveyors are not in use, or when the conveyors are occupied by a load or a pallet.

Figure 2:
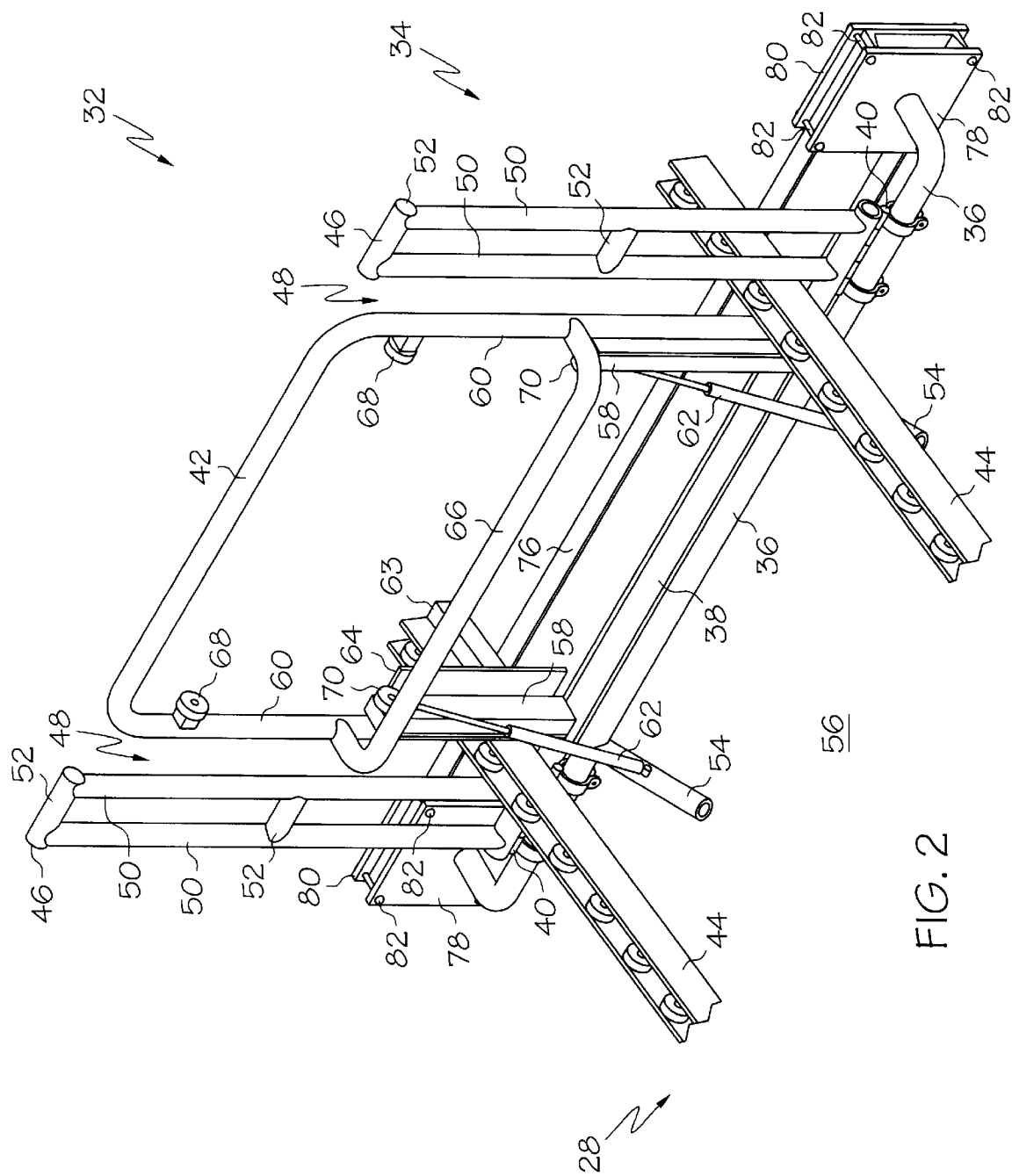
FIG. 2 is a perspective view of an embodiment of the knock-over gate assembly of the present invention as positioned within a load-in side opening of a elevated loading platform.
Figure 3:
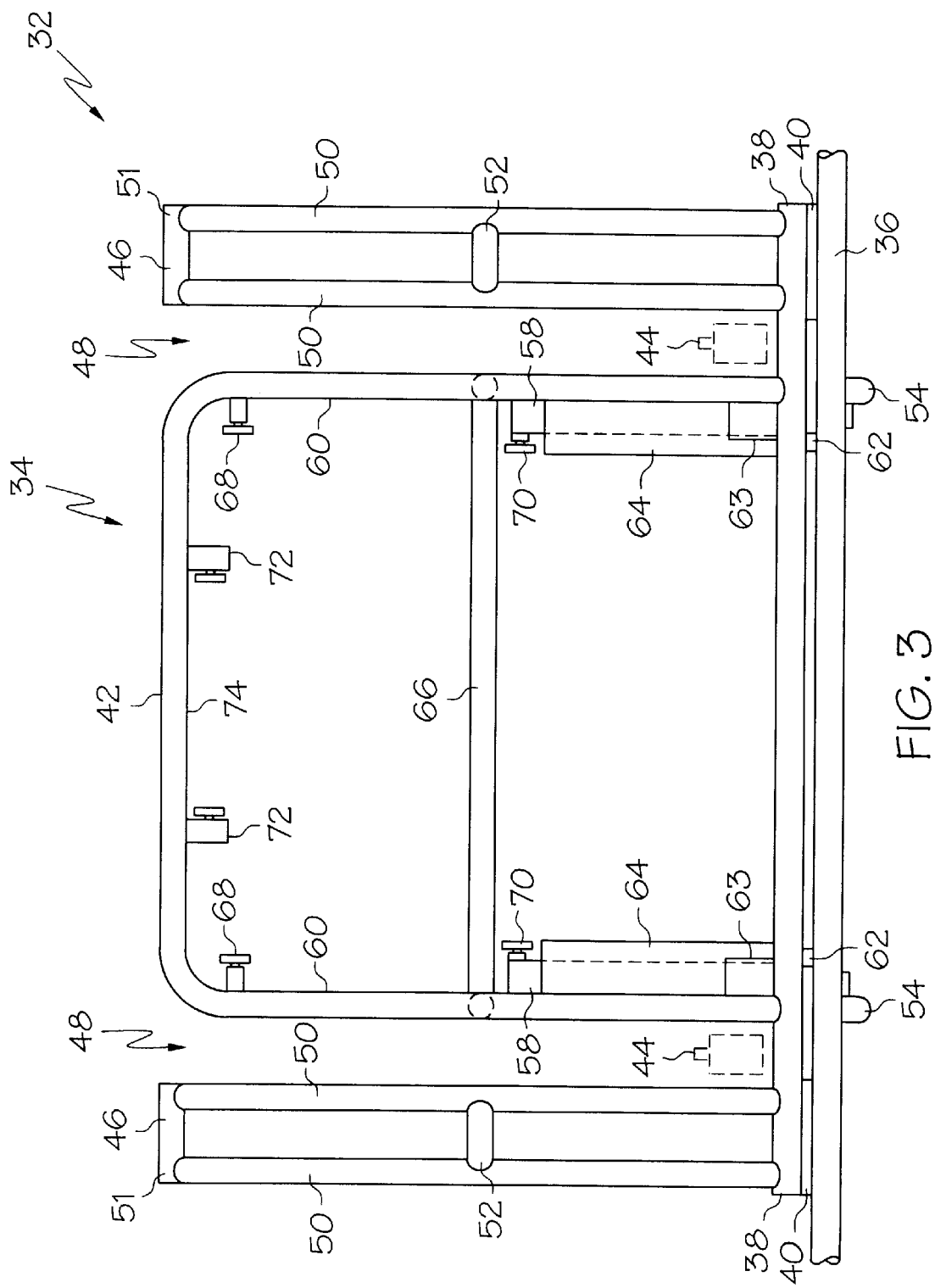
FIG. 3 is an elevational, load-in side view of the knock-over gate assembly of FIG. 2.

As shown in FIGS. 2 and 3, a first embodiment of the knock-over gate assembly 32 according to the present invention includes a substantially planar barrier member, such as a barrier gate 34, pivotably mounted to a mounting member 36. The barrier gate 34 includes a longitudinal base rail 38 pivotally mounted to the mounting member 36 by a pair of hinges 40. The longitudinal base rail 38, in the present embodiment, is made from 14 gauge steel tubing, and is welded (or otherwise fixed) to the hinges 40, which are in turn welded to the mounting member 36, which is also, in the present embodiment, made from 14 gauge steel tubing. The barrier gate 34 also includes substantially U-shaped middle segment 42 spanning substantially between the opposing pair of roller conveyor bars 44 of the roller conveyor 28. The barrier gate 34 also includes a pair of wing segments 46 welded to the base rail 38 on opposing sides of the U-shaped segment 42 such that gaps 48 are created between each wing segment 46 and the U-shaped segment 42. These gaps, as will be described in detail below, allow the conveyor bars 44 to pass through the barrier gate 34 as the barrier gate is being pivoted downward to a generally horizontal "loading" position. The U-shaped segment is, in the present embodiment, made from 14 gauge steel tubing, welded at its respective ends to the base rail 38. The wing segments 46 each include a pair of vertical rails 50, an upper rail 51 extending between the vertical rails 50 and a mid rail 52 extending between the vertical rails. The vertical, upper and mid rails 50–52 are, in the present embodiment, made from 14 gauge steel tubing.

As shown primarily in FIG. 2, the mounting member 36 includes a pair of legs 54 extending downwardly to contact the decking surface 56; and the U-shaped middle segment 42 includes a pair of vertical posts 58 welded to the vertical legs 60 of the U-shaped member 42, where the posts 58 are substantially aligned with the legs 54 attached to the mounting member 36. Coupled between each aligned pair of legs 54 and posts 58 is a return mechanism 62 for biasing the barrier gate 34 to an upright vertical position with respect to the decking 56 (the position shown in FIG. 2). In the present embodiment, the return mechanisms 62 are gas springs. A pair of horizontally extending bars 63 (only one shown), aligned with the posts 58, are welded to the beam 76 and act as stops, inhibiting the return motion of the barrier gate 34 caused by the return mechanisms 62 to the 90°, vertical upright position. Attached to the load-in sides of the posts 58 are a pair of steel rub/contact plates 64 which are adapted to be hit and pressed upon by the tines of the forklifts or by the pallets themselves.

A U-shaped mid rail 66 is welded between the legs 60 of the U-shaped middle segment 42 such that it arcs inwardly and horizontally towards the handling side of the platform. This mid rail 66, made from 14 gauge steel tubing, provides a barrier for restricting passage through the U-shaped middle segment 42 and also provides structural strength to the U-shaped middle segment 42. As will be discussed further below, the mid rail 66 also provides a support for contacting the decking when the barrier gate 34 is pushed to the horizontal loading orientation.

Referring to FIGS. 2 and 3, in the present embodiment, two pairs of freely spinning rollers 68, 70 are rotatably mounted to inwardly extending bosses welded to the inner area of the legs 60 of the U-shaped middle segment 42. As will be discussed in detail below, these rollers 68, 70 assist in allowing the pallets to travel over the barrier gate 34 when the barrier gate is in the horizontal loading position. As shown in FIG. 3, an alternate pair of rollers 72 may also be provided along the cross-rail portion 74 of the U-shaped member.

Referring to FIG. 2, the conveyor assembly 28 includes the pair of roller conveyor bars 44 that are angled slightly downwardly from a crossbeam 76 to the decking 56. Therefore, pallets placed on the conveyor bars will roll from the load-in end to the handling end of the loading platform. The conveyor bars 44 and the crossbeam 76 are pre-existing components of the loading platform, and the knock-over gate assembly 32 is designed so that it can be retrofit over the conveyor assembly 28 and crossbeam 76. Referring to FIGS. 2 and 5, the mounting member 36 is welded on each end thereof to a substantially square plate 78 which, in combination with a second substantially square plate 80 is used to sandwich the crossbeam 76 therebetween, fixing the two plates together with a set of bolts 82, thereby fixing the mounting bar 36 and the rest of the knock-over gate assembly 32 to the crossbeam 76.

Figure 6A:
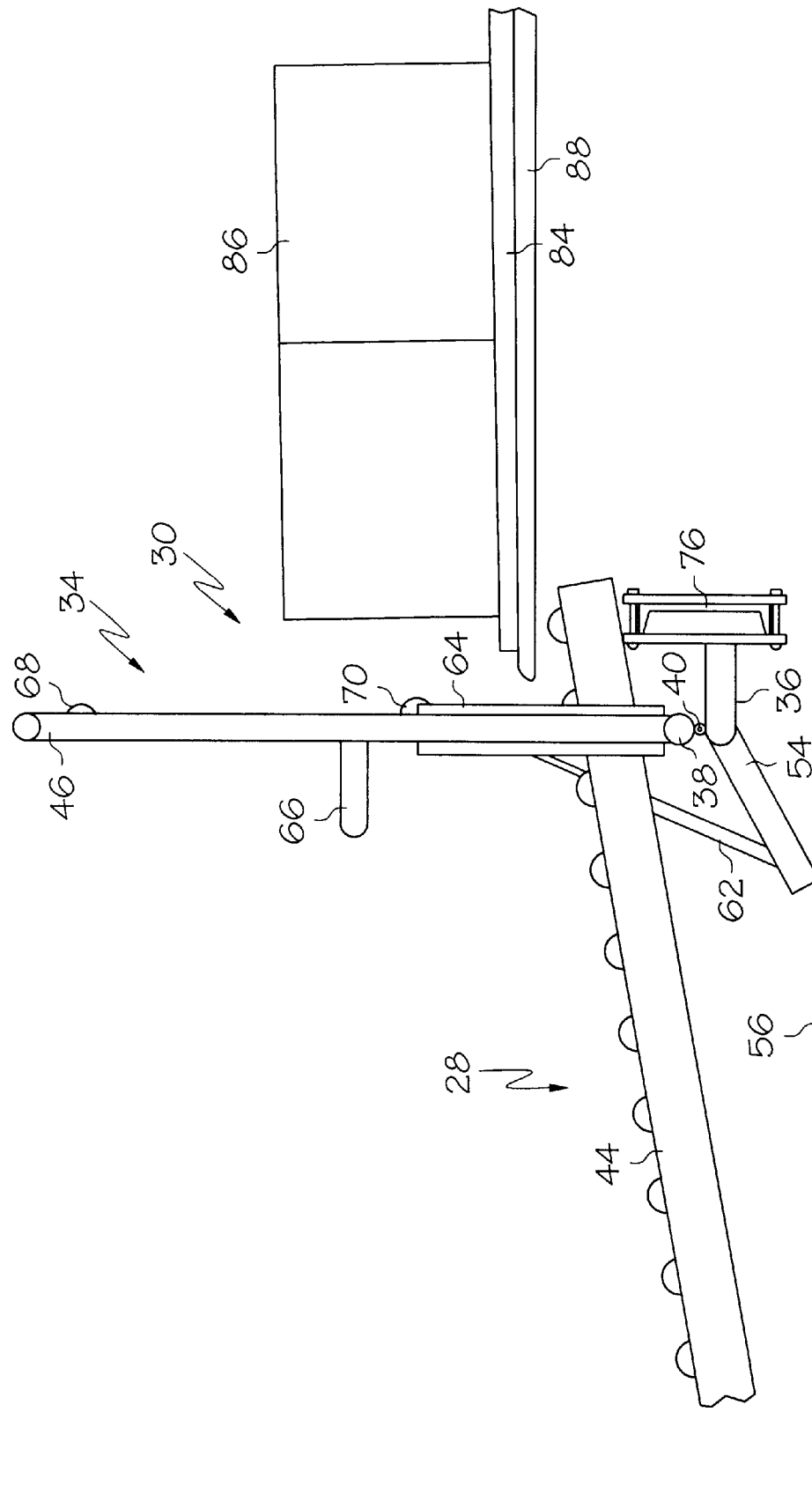
FIGS. 6a–6c are elevational side views of the knock-over gate assembly of FIGS. 2–5, each depicting different stages of the pallet loading procedure.
Figure 6B:
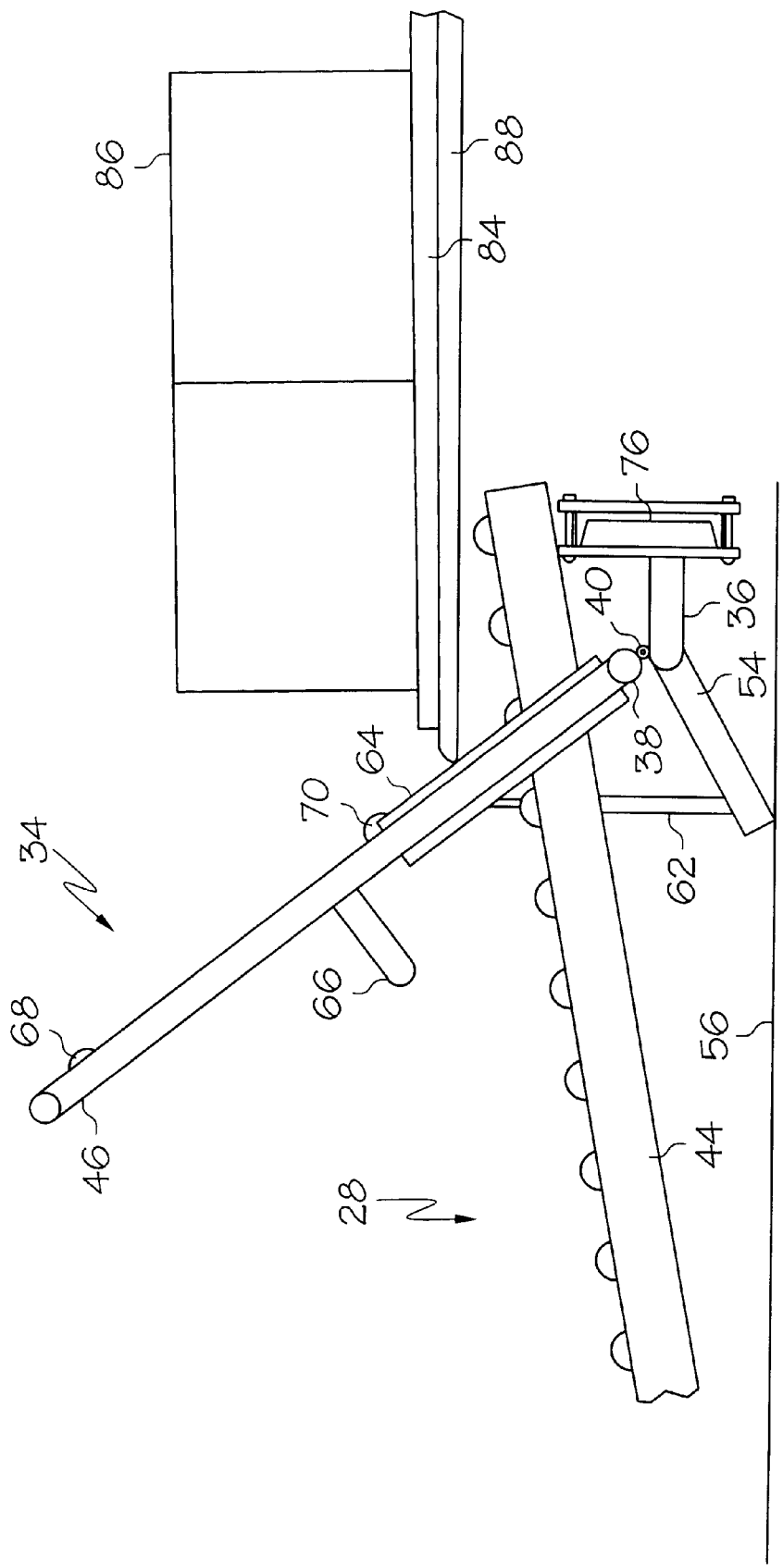
Figure 6C:
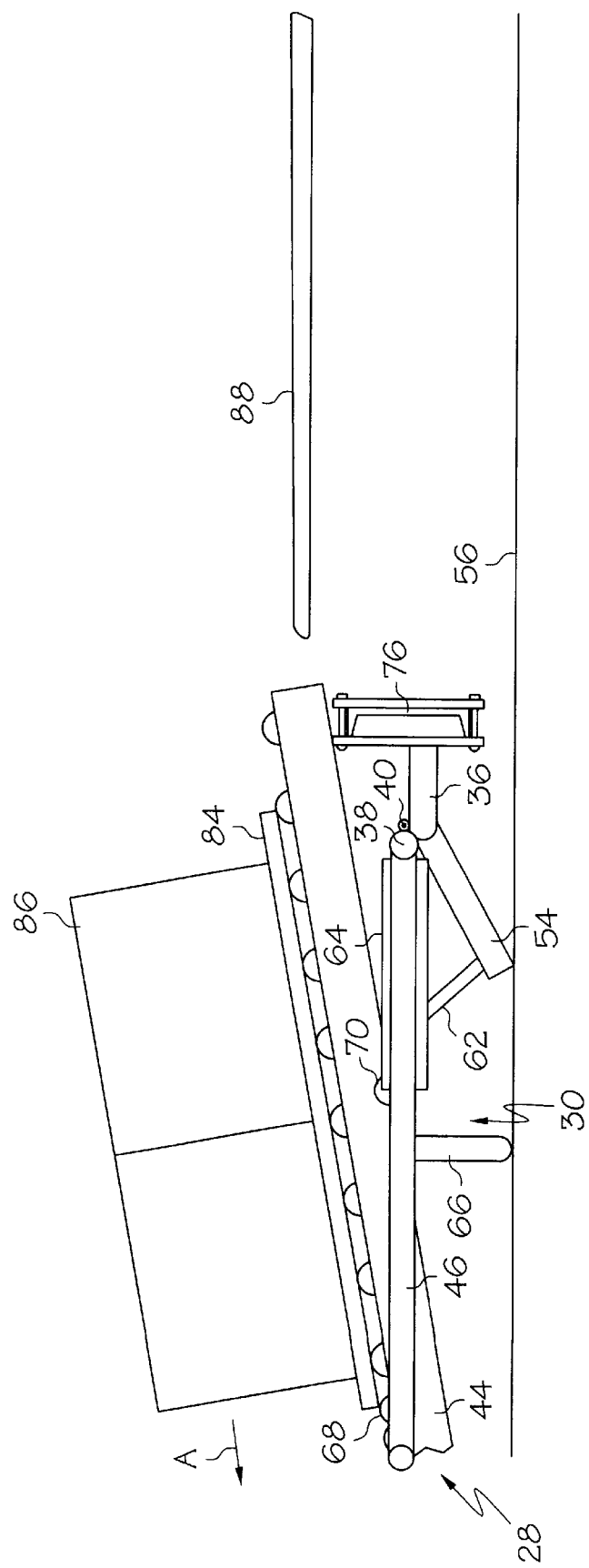

FIGS. 6a–6c illustrate the operation of the knock-over gate assembly 32 of the present invention. Referring to FIG. 6a, a pallet 84 containing goods or merchandise 86 is presented to the load-in side of the loading platform by a forklift (shown only by the forklift tines 88). At this time, the barrier gate 34 is in the substantially vertical barrier position because no pressure is being applied to the load-in side of the barrier gate, and accordingly, the springs 62 are fully extended. As shown in FIG. 6b, the tines 88 of the forklift truck contact and press against the rub/contact plates 64 and cause the barrier gate to pivot inwardly towards the handling side of the loading platform 20 at the pivot point formed by the hinge 40. As shown in FIG. 6c, the pallet is deposited onto the barrier gate 34 and conveyor 28, and because the weight of the pallet 84 overcomes the force of the springs 62, the barrier gate 34 is pivoted to its furthest horizontal extent such that the cross-rail 66 is contacting the decking 56 and such that the pallet 84 presses against and rolls upon the roller 68. It is noted here that the gaps 48 in the barrier gate 34 allow the barrier gate 34 to pass below the conveyor bars 44 so that the pallet is conveyed along the barrier gate 34 primarily by the conveyor surfaces provided by the conveyor bars 44. So long as the pallet 84 presses against the roller 68, the barrier gate 34 will remain in this substantially horizontal loading position. As will be described below, the barrier system may optionally include a hold-down latch assembly for retaining the barrier gate in its horizontal loading position until the pallet is conveyed beyond the barrier member.

As shown by arrow A, the pallet will roll downwardly along the conveyor 28 towards the handling side of the loading platform. Once the rear end of the pallet passes the roller 68, there is no longer any weight or force pressing down against the barrier gate 34; and therefore, the force of the springs 62 cause the barrier gate to be pivoted back again to its upright vertical position as shown in FIG. 6a. Accordingly, the opening 30 of the loading platform is always guarded, thereby substantially preventing a worker from falling through the opening. When no pallets are being loaded onto the conveyor 28, the knock-over assembly 32 provides a barrier for guarding the opening 30, and when pallets are loaded onto the conveyor, the pallets and the merchandise themselves provide a barrier to keep a worker from falling through the opening 30.

Preferably the knock-over assembly 32 is constructed to withstand at least two-hundred pounds of force from the handling side of the opening. The upper vertical rails should typically be positioned 40–50 inches from the decking, depending upon local safety codes; and the middle rail should typically be positioned 20–25 inches from the decking, depending upon local safety codes.

As shown in FIGS. 7 and 8, an alternate embodiment of the knock-over gate assembly includes a barrier gate 90 having a pair of vertical rails 92 welded to the base rail 38. The base rail 38 is in turn pivotably connected to the mounting member 36 by hinges 40. An upper cross-rail segment 94 extends horizontally between the top ends of the vertical rails 92 and a mid-section cross-rail segment 96 extends horizontally between the mid-sections of the vertical rails 92. Each of the cross-rail segments 94, 96 include inwardly facing C-channel segments 98, which are each aligned with the respective conveyor bars 44 such that when the barrier gate 90 is pivoted to the generally horizontal loading position, the C-channel segments 98 rest upon and enclose a portion of the conveyor bars 44. Each of the vertical rails 92 include a set of freely spinning rollers 100 mounted thereto so as to provide a conveying surface for the pallets received thereon. Although not shown in FIGS. 7 and 8, the present embodiment also includes springs for biasing the barrier gate 90 in the vertical, upright position and preferably includes rub/contact rails or plates for bearing the contact of the forklift tines and pallets.

In the present embodiment, the barrier gate 90, when pivoted to its generally horizontal loading position, will rest on the conveyor bars 44 and will thus be angled downwardly (slightly below horizontal) at substantially the same angle of the conveyor bars. But in the first embodiment (FIGS. 2–6), when pivoted to its generally horizontal loading position, the barrier gate 34 is oriented in a substantially horizontal orientation. Therefore, the term, 'generally horizontal,' when used with respect to the loading position of any barrier gate depicted in the present disclosure, is intended to cover any non-vertical or nearly-horizontal orientation of a barrier gate that allows articles to be conveyed thereover.

Figure 9:
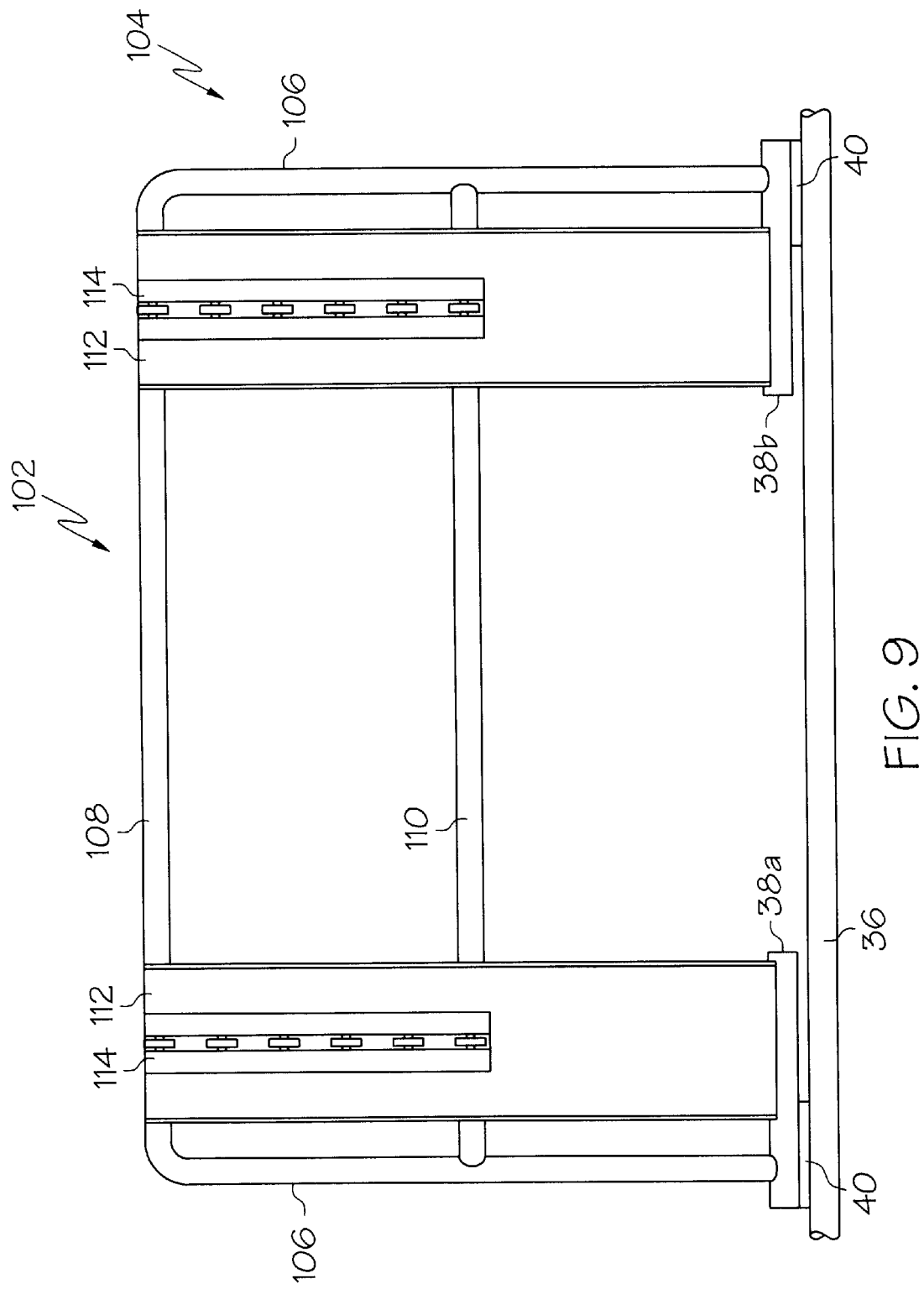
FIG. 9 is an elevational load-in side view of yet another alternate embodiment of a knock-over gate assembly for use with the present invention.

As shown in FIG. 9, a second alternate embodiment 102 of the present invention includes a barrier gate 104 comprising a pair of vertical posts 106 interconnected by a pair of horizontal rails 108, 110 where the top vertical rail 108 interconnects the top ends of the vertical posts 106 and the mid-section horizontal rail 110 interconnects the mid-sections of the vertical posts 106. The vertical posts 106 of the gate member are welded to horizontally extending base rails 38a, 38b, which are in turn rotatably coupled to a mounting bar 36 by a pair of hinges 40. Mounted to the load-in side of the barrier gate 104 are a pair of outwardly facing C-channel segments 112, and mounted within each of the C-channel segments is a roller conveyor section 114. The C-channel segments 112 and the roller conveyor sections 114 are aligned with the roller conveyor bars 44 such that when the barrier gate 104 is pivoted to the generally horizontal loading position, the barrier gate 104 rests upon the conveyor bars 44. It is preferable that in this embodiment, however, that the conveyor bars 44 are cut away to allow the barrier gate 104 to pivot to a generally horizontal position where that the conveyor segments 114 are substantially aligned with the conveyor bars 44 thereby allowing the pallets to roll from the conveyor segments 114 directly onto the conveyor bars 44. As with the embodiment of FIGS. 7 and 8, the present embodiment 102 will include springs for biasing the barrier gate 104 in an upright vertical position and will also include rub/contact plates or rails for being contacted by the tines of the forklift and the pallet during the loading operation.

Figure 10:
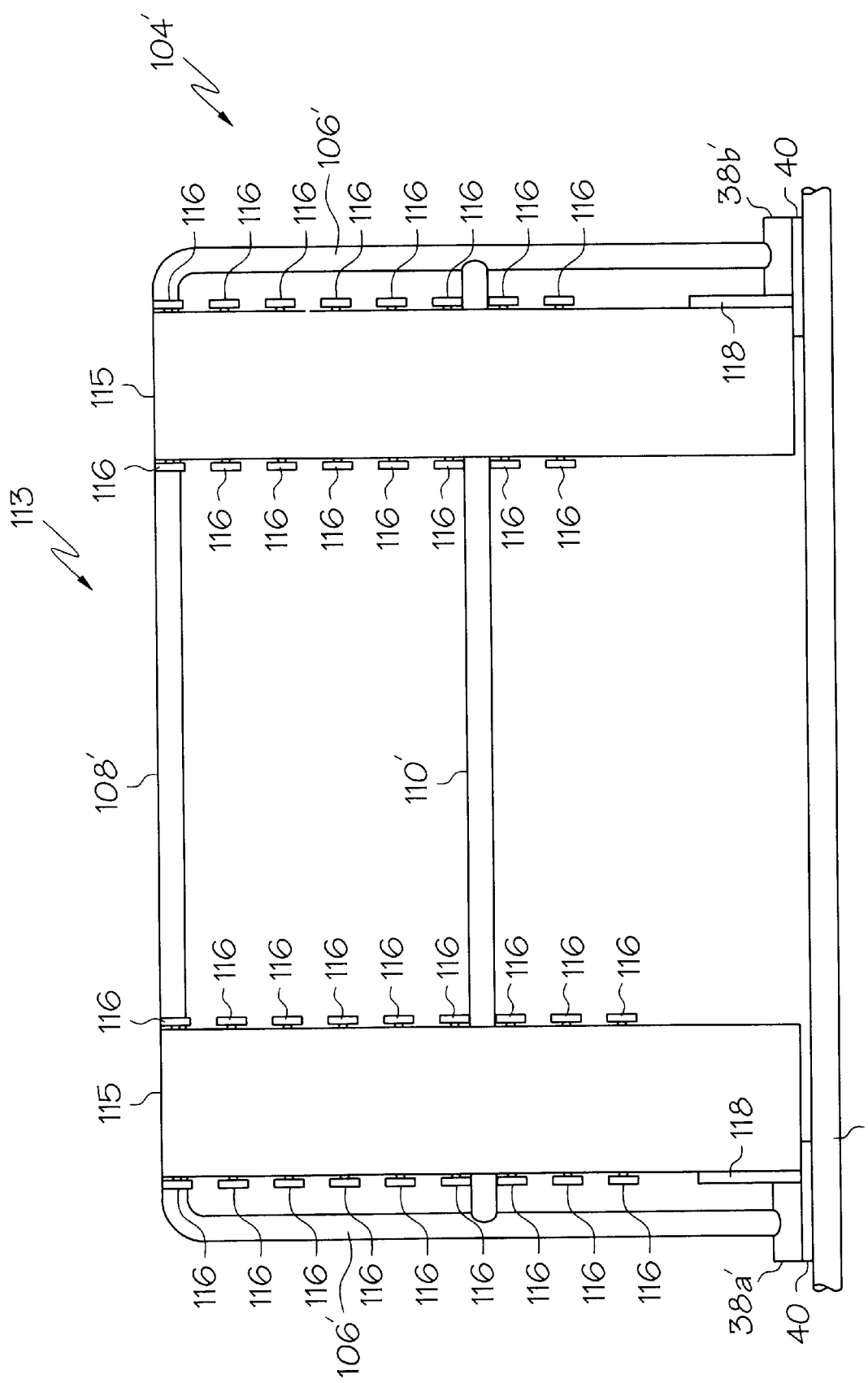
FIG. 10 is an elevational load-in side view of yet another alternate embodiment of a knock-over gate assembly for use with the present invention.

As shown in FIG. 10, another alternate embodiment 113 of the present invention includes a barrier gate 104' having a pair of vertical post members 106' and a pair of horizontal rail members 108', 110' respectively positioned along the top and mid-sections of the vertical post members 106'. In this embodiment, a pair of inwardly facing C-section segments 115 are mounted to the load-in side of the gate segment 104', where each of the C-section segments 115 include a plurality of freely spinning rollers 116 mounted on each lateral side thereof to provide a conveying surface for the pallet when the barrier gate 104' is in the generally horizontal, loading position. Mounted to each of the C-section segments are rub plates or contact members 118 which may be constructed of steel, ultrahigh molecular weight material (UHMW material), sacrificial wood and the like, which are adapted to be contacted by the tines of the forklift or by the pallets themselves. Preferably there are gaps cut into the vertical rails 108', 110' so that the conveyor bars 44 can be received therethrough and so that the C-section segments 114 can rest upon the conveyor bars. Accordingly, when the barrier gate 104' of the present embodiment is pivoted to the generally horizontal loading position, the pallet will be conveyed along the rollers 116 to the conveyor bars 44. Of course, the present embodiment 112 also includes springs for biasing the gate assembly in its upright vertical position when no force is being applied to the load-in side of gate assembly and when no pallets are being positioned thereon.

As shown in FIG. 11, an alternate embodiment 120 of the return mechanism utilizes a counterweight 122 attached to an end of a cable 124, which extends around or wraps around a cable sheave or pulley 126, and which attaches at its other end to the barrier gate 34. The cable sheave 126 is preferably mounted to a rack/mezzanine wall structure 128. Accordingly, when the barrier gate 34 is pivoted to its generally horizontal orientation, the force of the fork-lift truck tines against the barrier gate (or the force applied by the weight of the pallet) will overcome the weight of the counterweight 122, which will therefore be lifted by the cable 124. When the pallet passes past the barrier gate 34 and continues along the conveyor 28 to the handling side of the platform, there will be insufficient weight on the barrier gate 34 to keep the barrier gate in the generally horizontal orientation, and accordingly, the counterweight 122 will pull the barrier gate 34 to its vertical barrier position.

As shown in FIG. 12, a second alternate embodiment 130 of the return mechanism includes a pair of layover springs 132 mounted at one end to the mounting member 36 and the other end to the barrier gate 34. Accordingly, when the barrier gate 34 is pivoted to its generally horizontal orientation, the force of the fork-lift truck tines against the barrier gate (or the force applied by the weight of the pallet) will overcome the force of the layover springs 132. When the pallet is conveyed past the barrier gate, the force of the springs 132 will again overcome the weight of the barrier gate 34 and will cause the barrier gate to pivot to its vertical barrier position. Preferably, the layover spring is received within spring containment tubes 134 attached respectively to the mounting member 36 and the barrier gate 34.

Another alternate embodiment 136 of the return mechanism utilizes a torsion spring 138 mounted to a spring shaft 140, which is in turn mounted for rotation within a pair of bearing plates 142 extending from the mezzanine beam 76. The return mechanism 136 also includes a cable drum 144 axially mounted to the spring shaft 140 and which rotates with the spring shaft 140. A cable 146 extends from the cable drum around a cable sheave 148 attached to the mezzanine/rack structure 150, and is attached at its other end to the barrier assembly 34. Accordingly, when the pallets are being loaded onto the platform, the weight of the pallet or the force of the forklift truck tines against the barrier gate pivots the barrier gate 34 to its generally horizontal orientation, thus overcoming the force of the tension spring 138. Thereafter, when the pallet is conveyed towards the handling side of the platform, beyond the barrier gate 34, the force of the tension spring 138 causes the barrier gate 34 to return back to its vertical barrier position.

As shown in FIG. 15, yet another alternate embodiment of the return mechanism 150 utilizes an electro-mechanical linear actuator such as a hydraulic or pneumatic cylinder 152. As known to those of ordinary skill in the art, the cylinder 152 may be activated to contract and pivot into a loading position, which allows the barrier gate 34 to be generally horizontal, by a first switch (not shown). And when the pallet is conveyed past the barrier gate 34 on towards the handling side of the platform, a second switch (not shown) may trigger the cylinder 152 to actuate and thus force the barrier gate 34 to pivot back towards its upright vertical position. The first switch may be triggered, for example, by the pallet contacting the load-in side of the barrier gate 34, and the second switch may be triggered, for example, by the pallet passing a detector switch on the conveyor. Many switches and detection devices are commercially available for use with or as the first and second switches; all of which are within the scope of the present invention.

Figure 16:
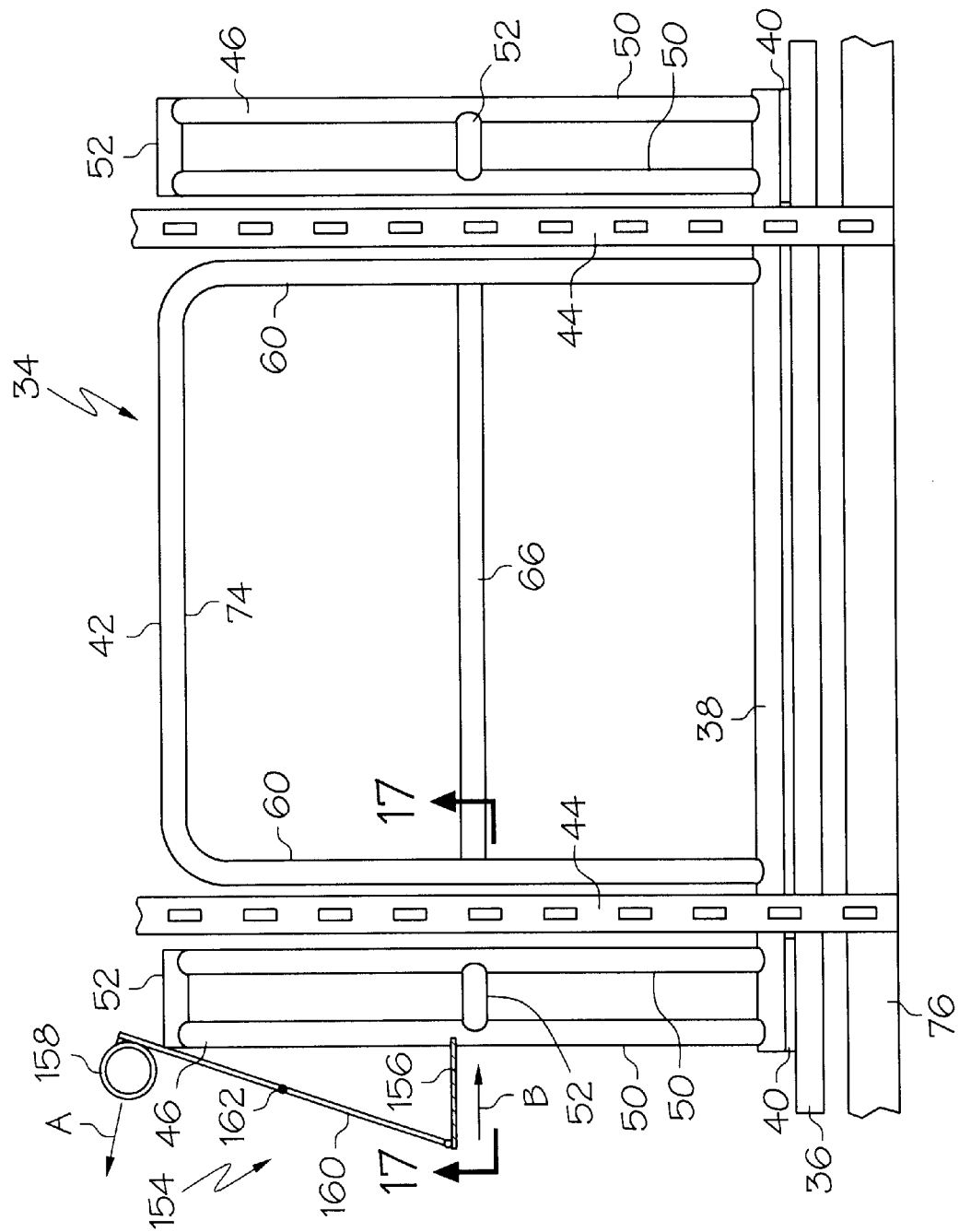
FIG. 16 is a top plan view of the knock-over gate assembly of FIGS. 2–5 shown in the "loading" position and incorporating a hold-down latch assembly.
Figure 17:
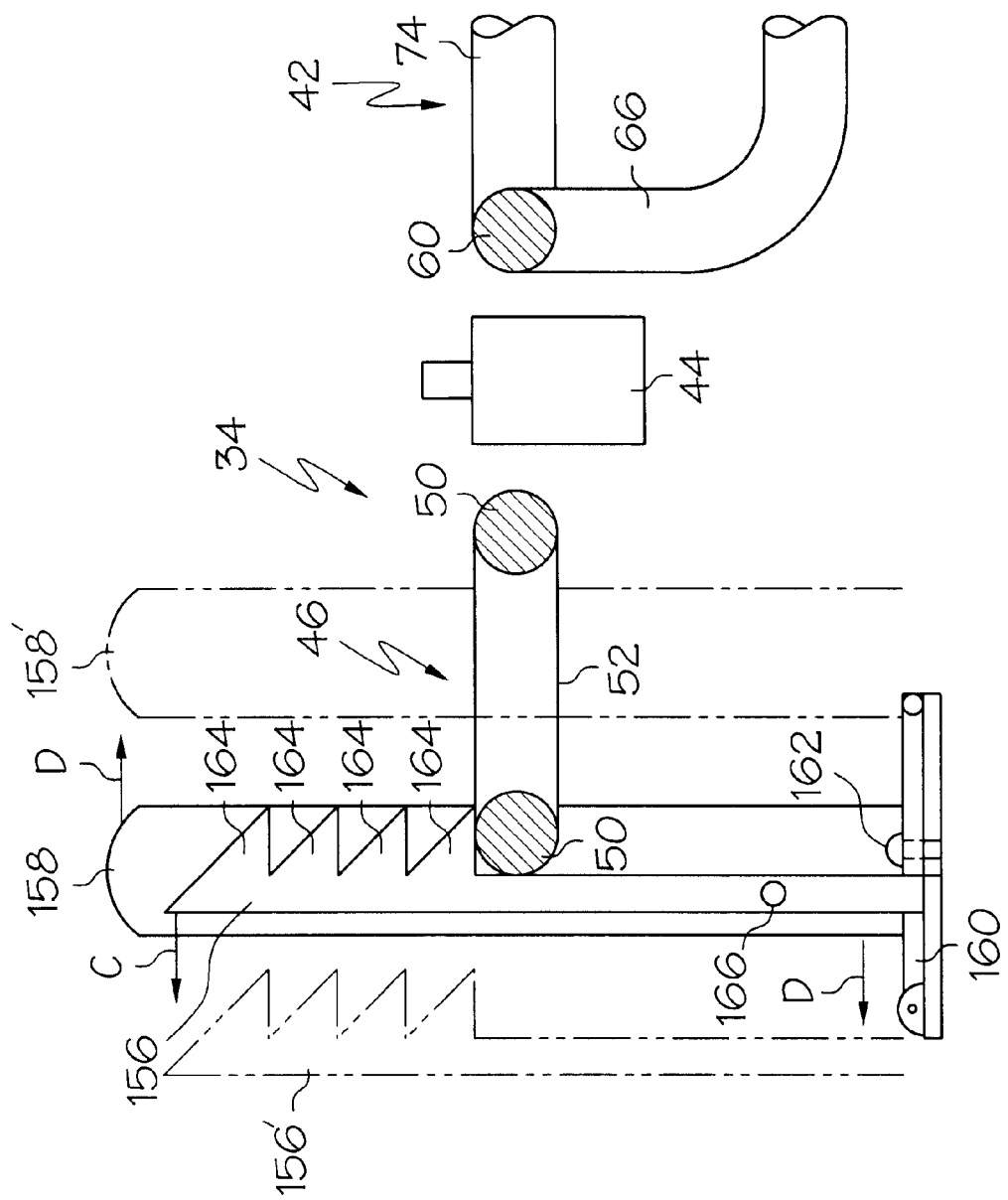
FIG. 17 is the knock-over gate assembly and hold-down latch assembly of FIG. 16, taken along lines 17—17 of FIG. 16.

As shown in FIGS. 16 and 17, an optional hold-down latch mechanism 154 is provided to retain the barrier gate 34 in the generally horizontal loading position in circumstances, for example, where the pallets being loaded onto the conveyors 28 do not have sufficient weight to hold down the barrier gate 34 on their own. Primary components of the hold-down latch mechanism 154 are a ratchet-like latch member 156, a hold-down trigger arm 158, and an actuator rod 160 interconnecting the latch member 156 and hold-down trigger arm 158 and pivotable about a pivot 162. In operation, the pallets will contact the hold-down trigger arm 158 forcing the trigger arm 158 laterally outwardly in the direction of arrow A (see FIG. 16). When the hold-down trigger arm is forced in the direction indicated by arrow A by the pallet, the actuator rod 160 will pivot about the pivot 162 thereby forcing the latch member 156 to translate laterally inward in the direction indicated by arrow B of FIG. 16. When in such a hold-down position, as shown in FIG. 17, the latch member's ratchet-like projections retain the barrier gate 34 in its generally horizontal loading orientation. The top edges of the ratchet projections 164 are downwardly angled such that if the latch member is prematurely moved in the locking position before the bearing member is placed in its loading orientation, the weight of the barrier gate 34 on these angled top surfaces of the latch member will cause the ratchet member to pivot outwardly in the direction indicated by arrow C about a pivot 166, thereby allowing the barrier gate 34 to transverse downwardly below the last projection of the latch member and be held in place by the last projection. When the pallet is conveyed along the conveyor 28 beyond the barrier gate 34 to the handling side of the platform, the pallet no longer forces the hold-down trigger arm 158 outwardly, and accordingly, a biasing mechanism (such as a spring, not shown) pivots the actuator rod such that the hold-down trigger arm 158 and the latch member 156 travel as indicated by arrows D to their free positions (as shown in FIG. 17). The free positions of the latch member 156' and the hold-down trigger arm 158' are shown in phantom.

Of course, as will be apparent to those of ordinary skill in the art, there are numerous mechanical, magnetic, electrical, etc. mechanisms available to those of ordinary skill in the art, which may be used to retain the barrier gate 34 in a loading position while the pallets are being conveyed there over and to thereafter release the barrier gate 34 so that it may be pivoted back up to its vertical upright position once the pallet passes beyond the barrier gate 34. Likewise there are numerous types of senors, switches and detectors capable of sensing when the presence or non-presence of articles on the barrier gate, and specifically to sense when the pallet is conveyed past the barrier gate. All of such hold-down mechanisms and sensors are intended to fall within the scope of the present invention.

Having described the invention in detail and with reference to the drawings, it will be apparent to those of ordinary skill in the art that changes can be made to the embodiments disclosed herein without departing from the scope of the invention as defined in the following claims.

What is claimed is:

1. A barrier system for protecting an edge of an elevated conveyor platform comprising:
   a gate pivotally mounted at a lower end thereof within the conveyor platform, approximate the edge of the conveyor platform, the gate being pivotable from a substantially vertical barrier position to a generally horizontal loading position; and
   a return mechanism, coupled to the gate, for pivoting the gate to the substantially vertical position.

2. The barrier system of claim 1, wherein:
   the gate has a load-in side facing outwards away from the platform when in the substantially vertical barrier position and a handling side facing inwards towards the platform when in the substantially vertical barrier position;
   the gate is pivotable from the substantially vertical barrier position inwardly towards the conveyor platform.

3. The barrier system of claim 2, further comprising a stop prohibiting the gate from pivoting outwardly beyond the substantially vertical barrier position.

4. The barrier system of claim 2, wherein:
   the return mechanism includes a biasing member, biasing the gate to the substantially vertical barrier position, where the biasing member is of sufficient weakness to allow the gate to pivot inwardly from the substantially vertical barrier position to the generally horizontal loading position when subjected to a predetermined load against the load-in side of the gate; and
   the biasing member is of sufficient strength to pivot the gate from the generally horizontal loading position to the substantially vertical barrier position once the load is removed from the load-in side of the gate.

5. The barrier system of claim 2, wherein the load-in side of the gate includes rollers attached thereto so as to facilitate the conveyance of articles thereover when in the generally horizontal loading position.

6. The barrier system of claim 2, wherein the load-in side of the gate includes rub-plates attached thereto and positioned to bear contact with forklift tines.

7. The barrier system of claim 2, wherein the gate includes at least one vertical gap adapted to receive a conveyor bar of the conveyor platform therein when the gate is pivoted to the generally horizontal loading position.

8. The barrier system of claim 1, wherein the gate includes at least two horizontal cross-rails, a first cross-rail being positioned approximately forty to fifty inches from a floor of the conveyor platform and a second cross-rail being positioned approximately twenty to twenty-five inches from the floor of the conveyor platform.

9. The barrier system of claim 8, wherein the second cross-rail is substantially U-shaped, arcing inwardly and horizontally towards the platform when the gate is in the substantially vertical barrier position, whereby the second cross-rail provides structural strength to the gate and also provides a support for contacting the floor of the conveyor platform when the gate is in the generally horizontal loading position.

10. The barrier system of claim 2, further comprising:
    a hold-down latch mechanism including a latch member engaging the gate when the gate is pivoted to the generally horizontal loading position and retaining the gate in the generally horizontal loading position.

11. The barrier system of claim 10, wherein the hold-down latch mechanism includes a sensing element, sensing the presence of articles being conveyed over the gate when the gate is positioned in the generally horizontal loading position.

12. The barrier system of claim 11, wherein the hold-down latch mechanism includes a release, operatively coupled to the sensing element, for releasing the gate from engagement with the latch member when the sensing element no longer senses the presence of articles being conveyed over the gate when the gate is positioned in the generally horizontal loading position.

13. The barrier system of claim 1, wherein:
    the return mechanism is a linear actuator, coupled between the gate and a stationary object;
    the linear actuator includes an activation switch extending from a load-in side of the gate so as to sense the presence of an article being pressed against the load-in side of the gate; and
    the linear actuator is operative to pivot the gate to the generally horizontal loading position upon activation of the switch.

14. A barrier system for protecting an edge of an elevated conveyor platform comprising:
    a gate pivotally mounted at a lower end thereof to a conveyor platform structure, approximate a load-in side opening of the conveyor platform, the gate being pivotable from a substantially vertical barrier position to a generally horizontal loading position; and
    means for pivoting the gate from the generally horizontal loading position to the substantially vertical barrier position when articles are not being conveyed over the gate.

15. The barrier system of claim 14, further comprising means for facilitating the conveyance of articles over the gate when the gate is in the generally horizontal loading position.

16. A method for loading pallets onto an elevated conveyor platform and for simultaneously protecting workers from an edge of the elevated conveyor platform comprising the steps of:

providing a gate having a lower end pivotally mounted to a stationary platform structure, approximate the edge of the conveyor platform, the gate being pivotable from a substantially vertical barrier position to a generally horizontal loading position;

pivoting the gate to the generally horizontal loading position;

loading an article on the generally horizontal gate;

conveying the article over the generally horizontal gate; and after the article has been pivoted over the generally horizontal gate, pivoting the gate back to the substantially vertical barrier position.

17. The method of claim 16 further comprising the steps of:

retaining the gate in the generally horizontal loading position after the gate is pivoted to the generally horizontal loading position.

18. The method of claim 17, further comprising the steps of:

sensing the presence or non-presence of articles on the gate retained in the generally horizontal loading position; and upon the sensing the non-presence of articles on the gate locked in the generally horizontal loading position, releasing the gate from the generally horizontal loading position.

19. An elevated conveyor platform comprising:

an elevated platform structure having a load-in side opening for receiving articles therethrough;

at least one conveyor mounted to the platform structure, for conveying articles from the load-in side opening to a handling side of the conveyor platform;

a gate pivotally mounted at a lower end thereof to the platform structure, approximate the load-in side opening of the platform structure, the gate being pivotable from a substantially vertical barrier position inwardly away from the load-in side opening, to a generally horizontal loading position; and a return mechanism, coupled to the gate, for returning the gate to the substantially vertical position.

20. The elevated conveyor platform of claim 19, wherein the gate includes a vertical gap, aligned with the conveyor, for receiving the conveyor therein when the gate is pivoted to the generally horizontal loading position.

21. The elevated conveyor platform of claim 19, wherein the gate has a load-in side and a handling side and the gate includes rollers attached to its load-in side so as to facilitate the conveyance of articles thereover when in the generally horizontal loading position.

22. The elevated conveyor platform of claim 19, further comprising a hold-down latch mechanism including a latch member engaging the gate when the gate is pivoted to the generally horizontal loading position and retaining the gate in the generally horizontal loading position.

23. The elevated conveyor platform of claim 19 further comprising a sensor, operatively coupled to the return mechanism, the sensor being positioned to detect the presence or non-presence of articles present upon the gate when the gate is in the generally horizontal loading position, the sensor being operative to activate the return mechanism upon the detection of the non-presence of articles upon the gate when the gate is in the generally horizontal loading position.

* * * * *

UNITED STATES PATENT AND TRADEMARK OFFICE
CERTIFICATE OF CORRECTION

PATENT NO.   : 6,138,812
DATED        : October 31, 2000
INVENTOR(S)  : Tom Kimener It is certified that error appears in the above-identified patent and that said Letters Patent is hereby corrected as shown below:

Claim 16, Column 11,
Line 11—The word "pivoted" should be -- conveyed --.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*